United States Patent [19]
Hosaka et al.

[11] 3,871,472
[45] Mar. 18, 1975

[54] ACTUATOR OF MOTOR VEHICLE SAFETY DEVICE

[75] Inventors: Akio Hosaka; Shunji Matsui, both of Yokohama, Japan

[73] Assignee: Nissan Motor Company, Limited, Yokohama City, Japan

[22] Filed: Feb. 22, 1973

[21] Appl. No.: 334,623

[30] Foreign Application Priority Data
Feb. 23, 1972 Japan.............................. 47-21616

[52] U.S. Cl............................. 180/103, 280/150 AB
[51] Int. Cl............................................. B60r 21/10
[58] Field of Search ............. 280/150 AB; 180/103; 340/262, 52 H

[56] References Cited
UNITED STATES PATENTS

| | | | |
|---|---|---|---|
| 3,622,974 | 11/1971 | Best......................... | 280/150 AB X |
| 3,629,816 | 12/1971 | Gillund............................ | 180/103 |
| 3,714,627 | 1/1973 | Dillman........................... | 340/262 |
| 3,742,858 | 7/1973 | Stonestrom............... | 280/150 AB X |
| 3,758,131 | 9/1973 | Stephenson.................. | 280/150 AB |
| 3,767,228 | 10/1973 | Lewis.......................... | 280/150 AB |

*Primary Examiner*—Kenneth H. Betts

[57] ABSTRACT

An actuator for actuating a safety device for a motor vehicle in which in the event that the motor vehicle encounters a collision, a rear seat confinement is first inflated through an instant collision sensor by the actuation of a rear seat detonating means and, some time after the inflation of the rear seat confinement, a front seat confinement is inflated through a delayed-action collision sensor by the actuation of a front seat detonating means. An electric power supply for energizing the actuator comprises not only a DC battery as a main power source but also an auxiliary power source such as a capacitor which is charged by the source voltage of the DC battery. The front seat detonating means may be actuated by the auxiliary power source even though the main power source happens to become inoperative for some cause or other.

2 Claims, 3 Drawing Figures

ACTUATOR OF MOTOR VEHICLE SAFETY DEVICE

The present invention is generally concerned with a safety device for a motor vehicle and, more particularly, with an actuator for reliably actuating the safety device in the event that the motor vehicle encounters a collision.

It is well known that motor vehicles are equipped with safety devices for protecting vehicle occupants from injuries in the event of a collision. A known safety device generally comprises an expansible or inflatable confinement such as a protector netting or bag and an actuator including electrically actuable detonating means for firing an explosive charge retained therein to release pressurized gas from a gas reservoir into the protector bag and collision sensors or impact responsive switch means for sensing an impact during the collision, either of which is connected to a suitable power supply such as a DC battery mounted on the vehicle body. Such a protector bag is usually provided not only in front of the front seat occupants but also in front of the rear seat occupants. As is appreciated by those skilled in the art, in the event of the collision of the motor vehicle, the force of impact upon the rear seat occupants is considerably different from that upon the front seat occupants, that is, the former is greater than the latter. Further, the front seat occupant, especially the vehicle driver can suspect danger just prior to the collision of the motor vehicle so that he will be able to protect himself against the danger of the collision to a certain degree, for example by taking fast hold of the steering wheel of the motor vehicle. On the other hand, however, the rear seat occupants are sometimes unable to suspect danger of the collision just prior to the collision so that they are liable to be badly injured. Therefore, it will be appreciated that the protector bag for the rear seat occupants should be actuated earlier than the protector bag for the front seat occupants is actuated. In other words, the front seat protector bag may be inflated some time after the rear seat protector bag is inflated. The delayed inflation of the front seat protector bag for the front occupant, especially the vehicle driver brings about his accurate understanding of the collision of the motor vehicle so that he will be able to take all possible steps to meet the situation of the collision because he can judge how to do it.

In accordance with the present invention, for this purpose, an actuator of a safety device includes an instant collision sensor or impact responsive switch means adapted for actuating a rear seat protector bag and a delayed-action collision sensor or impact responsive switch means adapted for actuating a front seat protector bag. The instant impact responsive switch means is such as to start its operation immediately after a collision occurs and the delayed-action impact responsive switch means is such as to start its operation some time after the operation of the instant impact responsive switch means starts. Thus, in the event that the motor vehicle encounters a collision, the rear seat protector bag is actuated first through the instant impact responsive switch means by the actuation of rear seat detonating means, and some time after the inflation of the rear seat protector bag, the front seat protector bag is inflated through the delayed-action impact responsive switch means by the actuation of front seat detonating means. Briefly stated, the safety device according to the present invention is actuated in two steps by the operation of the above-mentioned switch means in the event of the collision.

The actuator of the safety device is usually connected to an electric power supply such as a DC battery mounted on the vehicle body to close a circuit when a collision occurs. There is, however, a possibility of the DC battery becoming inoperative due to shocks or physical breakage caused by the collision of the motor vehicle. For instance, the battery per se could be destroyed or broken down, or electric connectors interconnecting the battery and the actuating means could be cut or disconnected from the battery so that a power supply circuit can not be closed. As mentioned above, the front seat protector bag of the present invention is actuated some time after the actuation of the rear seat protector bag in the event of a collision of the motor vehicle, so that there is a possibility that the front seat protector bag becomes inoperative due to such a failure occurring in the electric circuit of the actuator, with the result that the front seat occupants would be badly injured.

To solve this problem, an electric power supply system of the present invention includes not only a DC battery as a main power source but also an auxiliary power source such as a capacitor which is charged by the source voltage of the DC battery. The auxiliary power source is especially adapted to actuate the detonating means for the front seat protector bag in the event that the main power source happens to become inoperative. In this connection, it should be noted that the auxiliary power source of the invention never actuates the detonating means for the rear seat protector bag, that is, it is utilized for actuating the front seat detonating means only, so that the capacitor forming the auxiliary power source may be such as to have a relatively small capacitance. This makes the power supply system compact in construction. If the auxiliary power source is utilized for actuating both the front and rear seat detonating means, then an electric DC energy stored in the capacitor is largely exhausted from detonating the rear seat means before the front seat detonating means is actuated, so that thereafter the capacitor will not be able to actuate the front seat detonating means. Otherwise, it is necessary to employ such a capacitor as having a large capacitance in the auxiliary power source. If the rear seat detonating means requires an auxiliary power source having a capacitor, then it is to be provided with another auxiliary power source for the rear seat detonating means only in addition to the auxiliary power source for the front seat detonating means only.

It is therefore an object of the present invention to provide an actuator which is adapted for reliably actuating a safety device for a motor vehicle.

Another object of the present invention is to provide an actuator of the type which is capable of actuating a front seat confinement of the safety device some time after the rear seat confinement is actuated.

Still another object of the present invention is to provide an actuator which is capable of reliably actuating the front and rear seat confinements even though a main power source would accidentally become inoperative for some cause or other.

A further object of the present invention is to provide an actuator which is reliable in operation and compact in construction.

A still further object of the present invention is to provide an actuator which is economical to manufacture.

The present invention is only limited by the appended claims. A better understanding of the above and further objects and the advantages of the present invention may be obtained by referring to the drawing in which like reference numerals and characters designate similar parts throughout various figures and in which:

Figure 1:
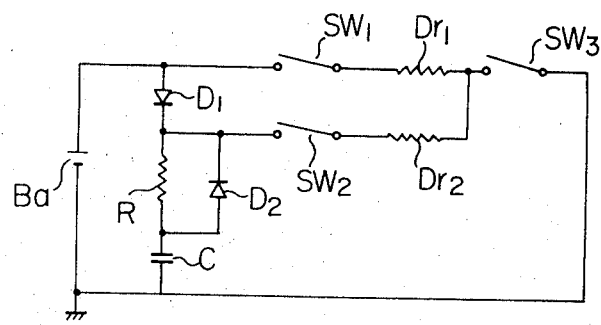
FIG. 1 is a schematic circuit diagram illustrating an overall arrangement of a preferred embodiment of an actuator for a safety device in accordance with the present invention.

Referring more particularly to FIG. 1, there is shown an example of an electric circuit of an actuator of a safety device in accordance with the present invention. In the electric circuit of the actuator, an electric power supply as a main power source is represented by a DC battery $Ba$ which is shown as grounded at its negative terminal. Connected in series with the DC battery $Ba$ are a first series circuit formed by an instant collision sensor or impact responsive switch means $SW_1$ which is connected in series to an electrically actuable detonating means $Dr_1$ adapted for actuating a rear seat protector bag, and a second series circuit formed by a delayed-action collision sensor or impact responsive switch means $SW_2$ which is connected in series to an electrically actuable detonating means $Dr_2$ adapted for actuating a front seat protector bag. As shown, the first and second series circuits are shown as connected with each other. Between the series circuits and the negative terminal of the battery $Ba$ is connected a third collision sensor or impact responsive switch means $SW_3$. The switch means $SW_1$, $SW_2$ and $SW_3$ are such as to be operable to close in response to the collision condition of the motor vehicle. The delayed-action impact responsive switch means $SW_2$ is of the type which may start its operation some time after the motor vehicle encounters a collision. The switch means $SW_2$ may be of any known construction as long as it closes some time after switch means $SW_1$. These switch means are usually mounted on a collapsible protruding portion of the motor vehicle such as a bumper. The detonating means $Dr_1$ and $Dr_2$ are adapted for firing explosive charges retained therein to release pressurized gas from a gas reservoir into inflatable confinements such as protector bags during the collision.

Connected to a positive terminal of the battery $Ba$ is an anode of a diode $D_1$ through which current flows from the positive terminal of the battery $Ba$ in only one direction, that is, in the forward direction. One terminal of a resistor R is connected to a cathode of the diode $D_1$, another terminal of the resistor is connected to one terminal of a capacitor C as a power source for the second series circuit formed by the delayed-action switch means $SW_2$ and the detonating means $Dr_2$. Another terminal of the capacitor C is connected to the negative terminal of the battery $Ba$. The resistor R is shown as shunting a diode $D_2$ which serves to pass therethrough a discharge current from the capacitor C into the second series circuit. The resistor R serves to suppress the charging current flowing through the capacitor C from becoming so large as to damage or even to destroy either the capacitor C or the battery $Ba$. With this arrangement of the auxiliary power source system shown in FIG. 1, the capacitor C is charged by the source voltage at a rate which depends upon the values of resistance of the resistor R and the diode $D_1$ and the magnitude of the source voltage so that an amount of DC electric energy will be stored in the capacitor C dependently upon the capacitance thereof.

In addition, in the event that the motor vehicle encounters a collision and with the switch means $SW_1$, $SW_2$ and $SW_3$ closed, the battery $Ba$ supplies directly the DC electric energy stored therein to the first series circuit formed by the instant switch means $SW_1$ and the detonating means $Dr_1$ so that the switch means $SW_1$ first starts its operation so as to actuate the detonating means $Dr_1$, with the result that the rear seat protector bag is inflated. Simultaneously, the battery $Ba$ supplies through the diode $D_1$ the DC electric energy stored therein to the second series circuit formed by the delayed-action switch means $SW_2$ and the detonating means $Dr_2$ so that the switch means $SW_2$ starts its operation so as to actuate the detonating means $Dr_2$ some time after the collision of the motor vehicle begins, i.e., after the actuation of the detonating means $Dr_1$. In this instance, it should be noted that the capacitor C as the auxiliary power source never supplies the DC electric energy stored therein to the detonating means $Dr_1$ through the switch means $SW_1$ because of the provision of the diode $D_1$.

If the DC battery $Ba$ as a main power source happens to become inoperative due to shocks or physical breakage caused by the collision even though the detonating means $Dr_1$ is actuated, then the detonating means $Dr_2$ will not be supplied with the DC electric energy stored in the battery $Ba$. The auxiliary power source, i.e., the capacitor C then may be in turn operable effectively and the DC electric energy stored therein will be supplied to the detonating means $Dr_2$ through the diode $D_2$, resulting in the detonating means $Dr_2$ being actuated so as to inflate the front seat protector bag for the front seat occupants.

It will, however, be understood by those skilled in the art that the diode $D_1$ causes a considerable voltage drop thereacross when forward current flows therethrough, resulting in the capacitor C as the auxiliary power source being poorly charged. For instance, if the diode $D_1$ is a silicon diode, the voltage drop is approximately 0.6 to 1.0 volt. Accordingly, if such a silicon diode is employed in the auxiliary power source, the charging voltage supplied to the capacitor C decreases by the magnitude correspondent to the voltage drop caused by the silicon diode, resulting in the electric energy stored in the capacitor C to drop. Further, when the diode has to operate at a low temperature, its voltage drop is quite remarkable. For example, at the temperature of $-40°C$, the charging voltage supplied to the capacitor C decreases 10 per cent with regard to the source voltage of the DC battery $Ba$. As a result, the voltage drop caused by the diode $D_1$ incurs a loss of approximately 20 per cent of the electric energy stored in the capacitor C. In order to overcome the abovementioned problem, an actuator having an improved auxiliary power source is provided in accordance with the present invention.

Figure 2:
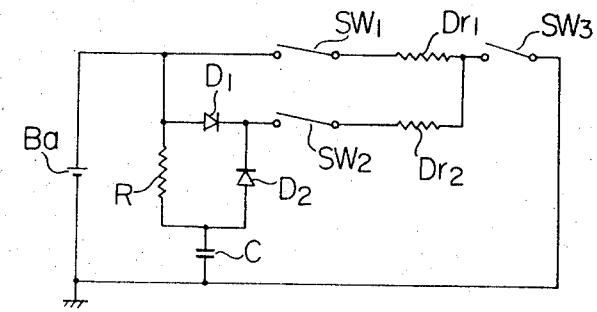
FIG. 2 is a schematic circuit diagram of a modified form of the embodiment shown in FIG. 1.

Reference is now made to FIG. 2 in which a modified form of the actuator shown in FIG. 1 is illustrated. In this Figure, connected to the positive terminal of the battery B$a$ is the anode of the diode D$_1$ through which forward current flows. A series connection bypassing the diode D$_1$ is formed by a resistor R having one terminal connected to the anode of the diode D$_1$ or the positive terminal of the battery B$a$ and the diode D$_2$ having its anode connected to the other terminal of the resistor R. The diode D$_2$ also allows forward current to flow therethrough. Connected between the negative terminal of the battery B$a$ and a junction between the resistor R and the diode D$_2$ is the capacitor C as the auxiliary power source. The capacitor C is charged through the resistor R due to charging current flowing from the positive to negative terminals of the battery B$a$. A second series circuit formed by the delayed-action switch means SW$_2$ and the detonating means D$r_2$ is connected to a junction between the diodes D$_1$ and D$_2$. The elements used in the actuator in FIG. 2 function similarly to the corresponding elements forming the actuator as described above with reference to FIG. 1.

From the circuit arrangement of the actuator, especially the auxiliary power source shown in FIG. 2, it will be appreciated that the circuit for charging the capacitor C does not involve the diode D$_1$ which causes a voltage drop thereacross as mentioned above. That is, the capacitor C is directly charged by the source voltage of the battery B$a$ straight through the resistor R without the diode D$_1$ so that the charging voltage across the capacitor C will become approximately equal to the source voltage of the battery B$a$. In other words, a full amount of electric energy may be stored in the capacitor C, which is supplied through the diode D$_2$ and the switch means SW$_2$ to the detonating means D$r_2$. Furthermore, it will be appreciated that the resistor R has a value of resistance considerably higher than that of the detonating means D$r_2$ so that most of the electric DC energy stored in the capacitor C may be supplied through the diode D$_2$ to the detonating means D$r_2$. This modified actuator including such an improved auxiliary power source operates and functions essentially similarly to the previously described embodiment of the actuator shown in FIG. 1. Accordingly, a specific description of its operation and function can be dispensed with and is hence omitted.

Figure 3:
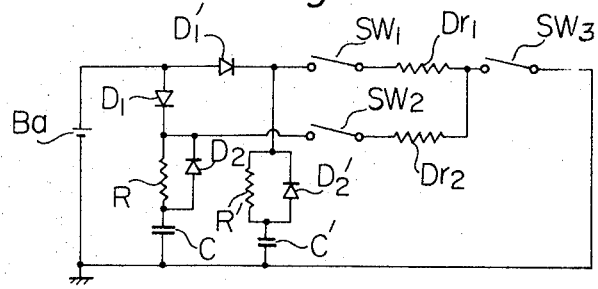
FIG. 3 is a schematic circuit diagram of another modified form of the embodiment shown in FIG. 1.

Another modified form of the actuator shown in FIG. 1 is illustrated in FIG. 3. In this modification, the auxiliary power source is provided not only for the detonating means D$r_2$ but also for the detonating means D$r_1$. The auxiliary power source for the detonating means D$r_1$ comprises a diode D$_1'$ connected between the positive terminal of the battery B$a$ and the switch means SW$_1$, a resistor R$'$ having a terminal connected to the cathode of the diode D$_1'$, a capacitor C$'$ connected between another terminal of the resistor R$'$ and the negative terminal of the battery B$a$, and a diode D$_2'$ shunted by the resistor R$'$. Being thus constructed, the detonating means D$r_1$ may be energized by the auxiliary power source including capacitor C$'$, even though the battery B$a$ could become inoperative before the detonating means D$r_1$ is energized by the battery B$a$. As shown, the auxiliary power source for the detonating means D$r_1$ in FIG. 3 has a form similar to that of the auxiliary power source shown in FIG. 1. However, it should be appreciated that the auxiliary power source shown in FIG. 2 may be employed as the auxiliary power source for the detonating means D$r_1$ to inflate the rear seat protector bag as well.

Many modifications may be made to the circuitry arrangement in the actuating means of the present invention as shown in FIGS. 1, 2 and 3. For instance, it will be appreciated that the battery B$a$ as a main power source may be grounded at its positive terminal and thereby having the diodes D$_1$ and D$_2$ connected in their reverse direction. Further, it should be appreciated that it is possible not only to increase the number of the detonating means but also to connect a plurality of series circuits formed by a detonating means and an impact responsive collision sensor in parallel with each other.

The detailed description of the preferred embodiment of the present invention is for the purpose of explaining the principles thereof and is not to be considered as limiting or restricting the present invention, since many modifications may be made by the exercise of skill in the art without departing from the scope of the present invention.

What is claimed is:

1. An actuator of safety devices for a motor vehicle comprising:
   a main DC power source;
   a first series circuit connected across said power source and formed by an instant impact responsive collision sensor which is connected to a first electrically actuable detonating means;
   a second series circuit connected in parallel with said first series circuit and formed by a delayed-action impact responsive collision sensor which is connected to a second electrically actuable detonating means; and
   an auxiliary power source for actuating said second detonating means and comprising a first diode connected between one terminal of said main power source and said second series circuit, a series connection formed by a resistor having one terminal connected to a junction between said one terminal of said main power source and said first diode and a capacitor connected between the other terminal of said resistor and the other terminal of said main power source, and a second diode having one terminal connected to the other terminal of said resistor and with the other terminal of said second diode being connected to a junction between said first diode and said delayed-action impact responsive collision sensor.

2. An actuator as claimed in claim 1, which further comprises another auxiliary power source for actuating said first detonating means comprising a third diode connected between said one terminal of said main power source and said first series circuit, a series connection formed by another resistor having one terminal connected to a junction between said third diode and said first series circuit and a second capacitor connected between the other terminal of said another resistor and the other terminal of said main power source, and a fourth diode which is shunted by said another resistor.

* * * * *